United States Patent [19]
Tamaki et al.

[11] Patent Number: 5,493,117
[45] Date of Patent: Feb. 20, 1996

[54] APPARATUS AND METHOD FOR GLOW DISCHARGE TREATMENT OF A MOVING WEB USING ELECTRODES FITTED INTO A SINGLE COMMON SOCKET AND HAVING END PORTIONS COVERED BY ELECTRICALLY CONDUCTIVE SHIELDS

[75] Inventors: Hiroyuki Tamaki, Shizuoka; Sumitaka Tatsuta, Kanagawa, both of Japan

[73] Assignee: Fuji Photo Film Co., Ltd., Kanagawa, Japan

[21] Appl. No.: 261,944

[22] Filed: Jun. 17, 1994

[30] Foreign Application Priority Data

Jun. 18, 1993 [JP] Japan ................... 5-147864

[51] Int. Cl.[6] .............................. H01T 19/00; H05H 1/24
[52] U.S. Cl. .................... 264/483; 427/535; 427/536; 219/121.49; 219/121.52; 219/121.59; 204/164; 204/165; 156/272.6; 250/324
[58] Field of Search ..................... 427/533, 534, 427/535, 536, 537, 538, 539, 540; 118/718, 723 E, 50.1; 219/121.49, 121.52, 121.59, 383; 264/22; 204/164, 165, 298.11, 298.24; 422/186.05, 186.06; 250/324, 325; 156/272.6

[56] References Cited

U.S. PATENT DOCUMENTS

| | | | |
|---|---|---|---|
| 3,288,638 | 11/1966 | van Paassen et al. | 427/533 |
| 3,959,104 | 5/1976 | Fales | 204/165 |
| 4,013,532 | 3/1977 | Cormia et al. | 204/164 |
| 4,334,144 | 6/1982 | Ferrarini | 204/122 |
| 4,466,258 | 8/1984 | Sando et al. | 427/538 |
| 4,472,467 | 9/1984 | Tamaki et al. | 427/569 |
| 4,504,349 | 3/1985 | Ueno et al. | 156/272.6 |
| 4,803,332 | 2/1989 | Koyama et al. | 204/164 |
| 5,211,759 | 5/1993 | Zimmermann et al. | 118/730 |
| 5,318,806 | 6/1994 | Montgomery et al. | 427/491 |

FOREIGN PATENT DOCUMENTS 0231436  8/1987  European Pat. Off. .

*Primary Examiner*—Terry J. Owens
*Attorney, Agent, or Firm*—Sughrue, Mion, Zinn, Macpeak & Seas

[57] ABSTRACT

Apparatus and method for glow discharge treatment of opposite surfaces of a moving web such as a plastic film or metallic sheet. The web moves in a vacuum housing between two rows of elongated electrodes arranged in a direction transverse to the direction of movement of the web. Coolant flows through an elongated hollow space in each electrode. The electrodes are fitted into a single common socket which is removably attached to the vacuum housing. A shielding member made of metallic material covers only the part of each electrode which is laterally offset to a side of the web. Each shielding member is connected to ground via a conductor and is spaced away from the outer peripheral surface of each electrode by a gap which is sufficiently small to prevent discharging of electricity from occurring in the gap when the web is subjected to glow discharging treatment.

9 Claims, 3 Drawing Sheets

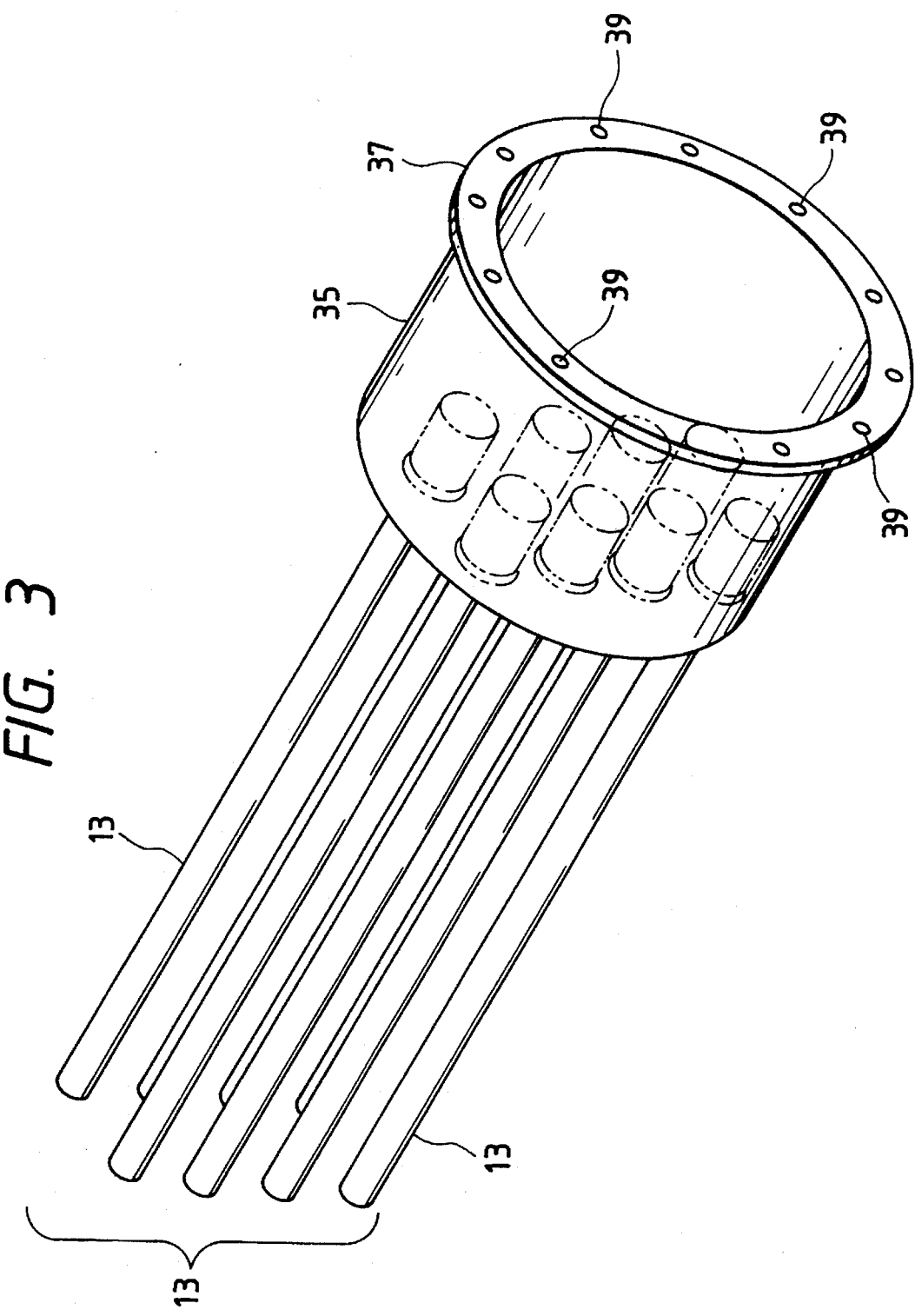

APPARATUS AND METHOD FOR GLOW DISCHARGE TREATMENT OF A MOVING WEB USING ELECTRODES FITTED INTO A SINGLE COMMON SOCKET AND HAVING END PORTIONS COVERED BY ELECTRICALLY CONDUCTIVE SHIELDS

BACKGROUND OF THE INVENTION

The present invention relates to a vacuum glow-discharging treatment method and an apparatus therefor, in which opposite surfaces of a web such as a plastic film or a metallic sheet is subjected to vacuum glow-discharging treatment in a vacuum condition in order to improve adhesive property, hydrophilic capability and dyeing capability of the web against another web or a coating material.

In the case that a photosensitive material is produced, it is well known in the art that opposite surfaces of a web-like support made of a plastic film are activated before the support is coated with a coating liquid such as an emulsion, in order to improve adhesiveness of the coating liquid to the support, and hydrophilic capability and dyeing capability of the support. In order to activate the opposite surfaces of the support, a method wherein opposite surfaces of a web-like support are subjected to glow-discharging treatment by applying a high voltage to a plurality of electrodes arranged so as to face the opposite surfaces of the support, is practically used (see U.S. Pat. No. 3,288,638, Japanese Patent Laid-Open Publication Nos. 53-13672, 54-80373, 56-1337, 56-1339 and 5-19899).

The method is practiced, for instance, such that a support is placed between a pair of metallic electrodes under a vacuum condition (e.g., 0.01 to 20 Torr) while applying a high voltage of 300 to 3000 V to the pair of electrodes with flowing electric current density of 0.5 to 50 mA per a unit area of each electrode. Japanese Patent Laid-Open Publication No. 53-13672 discloses an apparatus for activating the opposite surface of a web-like support employing such glow-discharging treatment, wherein a plurality of rod-shaped electrodes extending in parallel with each other in the transverse direction relative to the web-like support are arranged to face the opposite surfaces of the web-like support. One side of each rod-shaped electrode facing the support is constituted by a curved smooth surface, and a plurality of rod-shaped electrodes each designed in that way are arranged in the spaced relationship with a predetermined gap held between adjacent ones. In this apparatus, a distance between the support and the rod-shaped electrodes can easily be controlled by properly controlling a conveyance path of the support, so that surface treatment can satisfactorily be conducted with a desired degree of surface improvement.

When a long web-like support is continuously subjected to glow-discharging treatment, the temperature of each electrode is raised as electricity is discharged from the respective electrodes. On completion of the continuous electricity discharging for two to three hours, the temperature of each of the electrodes is elevated to a level of about 150° C. to 200° C. Each electrode is usually made of a metallic material such as aluminum, stainless steel or the like, and as the temperature of the electrode is raised to the foregoing level, the electrode may be thermally expanded and deformed. Especially, in the case that each electrode is prepared in the form of a rod-shaped electrode as mentioned above, the electrode of which opposite ends are supported by some means may be deflected due to the thermal expansion. Consequently, the support conveyed above or below the electrode thus deflected cannot be subjected to uniform surface treatment in the transverse direction of the support since the distance between the electrode and the support in the transverse direction is not constant.

Further, there is an adverse possibility that metallic components in the vicinity of the electrode may be brought in contact with the electrode, causing the components to be undesirably damaged. This damage on the components also leads to the result that an air-tight property for a vacuum condition cannot be maintained.

Furthermore, when the temperature of each electrode is raised, the sheath layer of a cable electrically connected to the electrode is thermally deteriorated, to shorten the running life of the cable. If the sheath layer of the cable is excessively deteriorated, a part of the sheath layer can crack, causing abnormal electric discharge from the cracked part of the sheath layer.

Therefore, with the conventional apparatus, since it is necessary to avoid excessive elevation of the temperature of the electrode when electricity is discharged from each electrode, continuous electricity discharging treatment cannot stably be conducted for a relatively long time period, i.e., more than two hours.

In addition, since the electrode is likely to be worn or degraded by spattering or the electrode and associated components must be replaced because of the foregoing unexpected problems, the electricity discharging apparatus is generally required to have a simple, replaceable arrangement to allow completion of replacing operations in minimal time.

SUMMARY OF THE INVENTION

The present invention has been made in consideration of the aforementioned drawbacks found in the prior art, and the objective of the present invention is to provide an apparatus and method for performing vacuum glow-discharging treatment, wherein by preventing the excessive temperature increase of each electrode, stable electricity discharging treatment can be conducted for a long time period without any occurrence of abnormal electricity discharging. Components constituting the apparatus are free from being damaged, and moreover, maintenance can easily be performed.

To accomplish the above-noted and other objectives, according to one aspect of the present invention, there is provided an apparatus for allowing the opposite surfaces of a web-like material to be subjected to vacuum glow-discharging treatment wherein the web-like material to be treated is conveyed in a vacuum housing while it faces a plurality of electrodes arranged on the opposite sides thereof so that the opposite surfaces of the web-like material are subjected to electricity discharging treatment by discharging electricity from the respective electrodes, wherein a hollow space serving as a coolant flow path is formed in each of the electrodes, and a coolant supplying pipe for supplying a coolant to the hollow space and a coolant discharging pipe for discharging the coolant from the hollow space are connected to each of the electrodes. Preferably, a plurality of electrodes are fitted to a single common socket adapted to be attached to and detached from the vacuum housing of the apparatus.

According to another aspect of the present invention, there is provided an apparatus for allowing the opposite surfaces of a web-like material to be subjected to vacuum glow-discharging treatment wherein the web-like material to be treated is conveyed in a vacuum housing while it faces a plurality of electrodes arranged on the opposite sides thereof so that the opposite surfaces of the web-like material are subjected to electricity discharging treatment by discharging electricity from the respective electrodes, wherein each of the electrodes is designed in the form of a rod extending in the transverse direction relative to the web-like material, a part of each of the electrodes which does not face the web-like material as seen in the longitudinal direction is covered with a shielding member made of a metallic material, and the shielding member is spaced away from the outer peripheral surface of each of the electrodes by a predetermined gap and earthed to the ground via a conductor, Preferably, a plurality of electrodes are fitted to a single common socket adapted to be attached to and detached from the vacuum housing of the apparatus.

According to further aspect of the present invention, there is provided a method of allowing the opposite surfaces of a web-like material to be subjected to vacuum glow-discharging treatment wherein the web-like material to be treated is conveyed in a vacuum housing while it faces a plurality of electrodes arranged on the opposite sides thereof so that the opposite surfaces of the web-like material are subjected to electricity discharging treatment by discharging electricity from the respective electrodes, wherein the opposite surfaces of the web-like material are subjected to electricity discharging treatment as each of the electrodes is cooled from inside by flowing a coolant through each of the electrodes.

According to further another aspect of the present invention, there is provided a method of allowing the opposite surfaces of a web-like material to be subjected to vacuum glow-discharging treatment wherein the web-like material to be treated is conveyed in a vacuum chamber while it faces a plurality of electrodes arranged on the opposite sides thereof so that the opposite sides of the web-like material are subjected to electricity discharging treatment by discharging electricity from the respective electrodes, wherein a part of each of the electrodes which does not face the web-like material is covered with a shielding member made of a metallic material, and the shielding member is spaced away from the outer peripheral surface of each of the electrodes by a predetermined gap and connected to ground via a conductor, so that the opposite surfaces of the web-like material are subjected to electricity discharging treatment by discharging electricity from the respective electrodes.

According to still another aspect of the present invention, there is provided a support usable for a photosensitive material. The support is produced by employing at least one of the above-noted methods so that the opposite surfaces of a web-like material of polyethylene naphthalate are subjected to surface treatment.

It is desirable that each electrode has a rod-shaped configuration having a circular cross-sectional shape.

A cooling capability of each electrode is determined based on a thermal capacity of each electrode, an electricity discharging capability of each electrode, a heat radiating capability of each electrode, physical properties of the coolant, a thermal capacity of the coolant, a flow rate or quantity of the coolant, a temperature of the coolant and so forth, and it is preferable that the cooling capability of each electrode is adjusted after various conditions associated with the apparatus are preliminarily determined in consideration of a scale of the apparatus and various operational conditions.

As to the coolant to be supplied to the hollow space of each electrode, either fluid or gas is usable. Water, oil or the like are available as the coolant. In particular, service water is the most available as the coolant of the invention. The coolant discharged from the electrode may be supplied to the electrode again for circulation after the heat received by the coolant is generated or radiated therefrom. Alternatively, the coolant discharged from the electrode may be directly drained to sewage if a large quantity of the coolant can be obtained easily as in the case of using service water.

The gap between the surfaces of the shielding member and the electrode serves as a dark space having a length shorter than a preliminary running distance wherein electricity discharging can occur, and it is preferable that the gap is set to 5 mm or less.

In addition, it is preferable that the axial length of a part of each electrode covered with the shielding member can be changed to one of plural lengths corresponding to the length of a part of each electrode covered with a single shielding member so that the electrode can be used for treatment of plural kinds of web-like materials having various respective widths. Alternatively, a plurality of shielding members each having a different axial coverage length may preliminarily be prepared so that an adequate shielding member can be selected therefrom corresponding to the width of the web-like material.

The shielding member can be disposed at the position corresponding to at least one end of the electrode as seen in the longitudinal direction of the electrode, but shielding members may be disposed at the opposite ends of the electrode so as to limitatively determine the electricity discharging range from the opposite sides.

An annular hollow space is formed in each electrode to flow a coolant therethrough so as to enable the electrode to be cooled from inside during electricity discharging. With this construction, the temperature of the electrode is not excessively elevated, even though electricity discharging treatment is continuously conducted with the apparatus. Thus, thermal deformation such as thermal expansion, thermal distortion or the like due to excessive elevation of the temperature of the electrode can be prevented, whereby stable electricity discharging treatment can be conducted without shutdown of the apparatus or deterioration of the same.

Since a part of the electrode which does not face the web-like material in the transverse direction relative to the latter is covered with the shielding member having a predetermined gap as measured from the outer peripheral surface of the electrode, electricity discharging does not occur at the foregoing part. Thus, unnecessary electricity discharging does not occur with the electrode. It is acceptable that a minimum quantity of electric power required for operating the apparatus is fed to each electrode. This leads to the result that a quantity of electric power to be consumed by each electrode can be reduced while preventing the temperature of the electrode from being excessively elevated. Accordingly, thermal deformation such as thermal expansion, thermal distortion or the like of the electrode due to excessive elevation of the temperature of the same can be prevented, whereby stable discharging treatment can be conducted with the apparatus without an occurrence of shutdown of the apparatus or deterioration of the same.

When a plurality of electrodes are fitted to a single socket adapted to be attached to and detached from the vacuum housing, they can easily be attached to and detached from the apparatus. This leads to the result that maintenance service and inspection can easily be performed for the apparatus.

According to the present invention, the apparatus includes a technical concept that each electrode is cooled by flowing a coolant therethrough for the purpose of preventing the temperature of the electrode from being excessively elevated and another technical concept that unnecessary electricity discharging is prevented to reduce a quantity of electric power to be consumed by each electrode by disposing at least one shielding member in the electrode for the same purpose as mentioned above. Thus, when the foregoing two technical concepts are combined with each other, the apparatus exhibits a more reliable effect for preventing the temperature of each electrode from being excessively elevated.

BRIEF DESCRIPTION OF THE DRAWINGS

FIG. 3 is a perspective view of a plurality of electrodes fitted to a socket.

DETAILED DESCRIPTION OF THE PREFERRED EMBODIMENT

The present invention will be described in detail hereinafter with reference to the accompanying drawings which illustrate a preferred embodiment thereof. It should be noted that detailed description on the present invention will be made in such a manner that the whole structure of an apparatus is first described and an electrode section, i.e., an essential part of the apparatus is then described.

Figure 1:
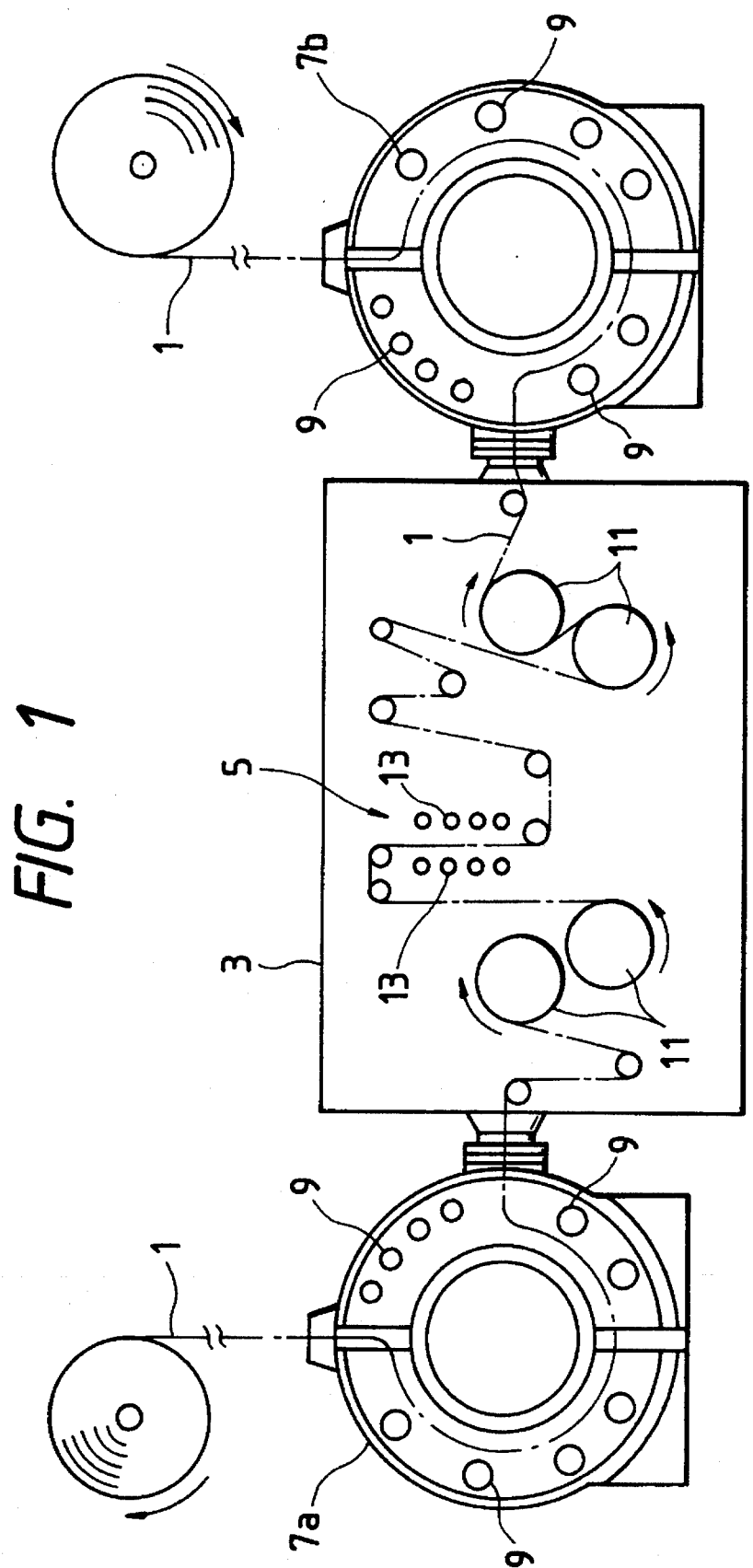
FIG. 1 is an illustrative view of an apparatus for allowing the opposite surfaces of a web-like material to be subjected to vacuum glow-discharging treatment according to an embodiment of the present invention.

FIG. 1 is an illustrative view of an apparatus for allowing the opposite surfaces of a web-like material to be subjected to vacuum glow-discharging treatment according to the embodiment of the present invention. For the purpose of convenience, FIG. 1 shows the arrangement of main components employable for conducting vacuum glow-discharging treatment and a conveyance path of a band-shaped material to be treated (which is represented by phantom lines).

A long web-like material 1 of PEN (polyethylene naphthalate) to be treated is preliminarily wound about a core in the form of a roll, and as it is unrolled from the roll, the opposite surfaces of the material 1 are subjected to surface treatment in a glow-discharging part 5 within a vacuum housing 3 under vacuum condition. The material 1 wound in the form of a roll is located in an atmospheric condition, and it is introduced into the vacuum housing 3 via an air shield section 7a.

The air shield section 7a includes a slit conveyance path serving as a path for the material 1 to be treated, and air in the slit conveyance path is stepwise drawn by way of several stages so that the degree of vacuum in the slit conveyance path is gradually increased in a stepwise manner. The slit conveyance path is communicated with a plurality of drawing holes 9 each of which is communicated with a drawing or suction unit having a different drawing capability so that the air remaining in the slit conveyance path is drawn. The drawing unit located nearer the downstream side has a higher drawing capability than that located further from the downstream side with respect to the conveyance of the web-like material 1. The air shielding section 7a arranged in the above-described manner secures the adequate vacuum state in the vacuum housing 3 while defining the conveyance path extending from an atmospheric condition to the vacuum condition.

A plurality of conveyance drums 11 on which the material 1 to be treated is suspended, and a large number of electrodes 13 constituting an electricity discharging section 5 are arranged in the vacuum housing 3. The vacuum housing 3 is communicated with a drawing means (not shown) so that the air in the vacuum housing 3 is drawn therefrom to thereby maintain a predetermined degree of vacuum. Four electrodes 13 are arranged along the conveyance path on the surface side of the material 1 to be treated, while another four electrodes 13 are likewise arranged along the conveyance path on the reverse side of the same. When the material 1 to be treated is held between plural opposing pairs of electrodes 13 in the interposed state, both the surface and reverse sides of the material 1 are simultaneously subjected to electricity discharging treatment. However, only one of the surface and reverse sides of the material 1 may be subjected to electricity discharging treatment if the electrodes 13 are disposed to face only one side of the material 1. On completion of the electricity discharging treatment of the material 1 for a predetermined period of time, the opposite surfaces of the material 1 are activated to exhibit desired adhesiveness, desired hydrophilic properties and desired dyeing properties.

After completion of the electricity discharging treatment, the material 1 is fed to the atmospheric condition via another air shielding section 7b, wound about a core again in the form of a roll. This air shielding section 7b is constructed in the same manner as the first-mentioned air shielding section 7a.

Figure 2:
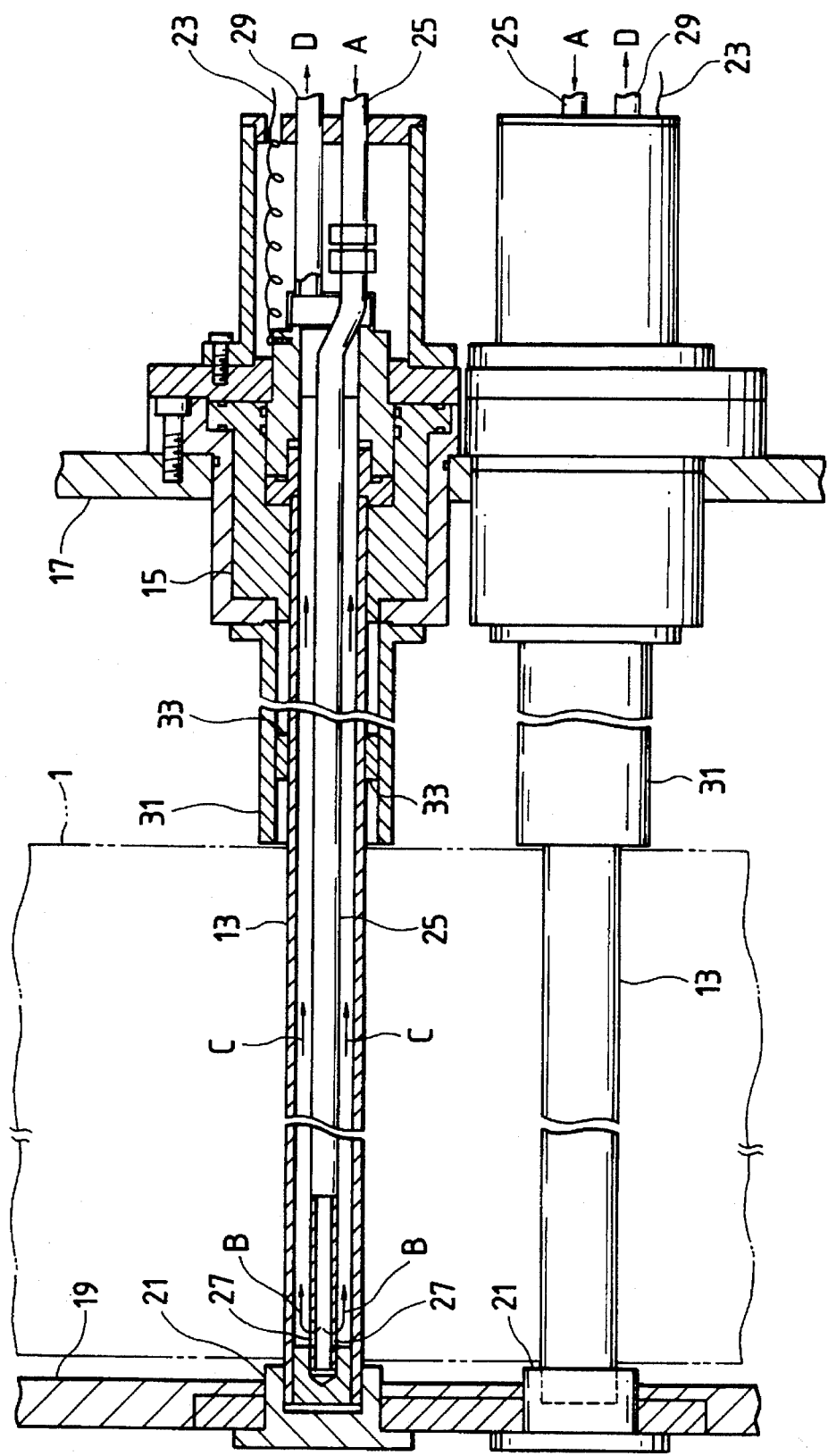
FIG. 2 is a fragmentary enlarged plan view of the apparatus, particularly showing the structure of each of two electrodes.

Next, each of the electrodes 13 will be described in more detail below with reference to FIG. 2 and FIG. 3. FIG. 2 is a plan view of two pair of electrodes 13 with the material 1 held therebetween. In FIG. 2, one of the electrodes 13, i.e., the upper electrode 13, is shown by way of a sectional view, whereas the lower electrode 13 is shown by way of a side view. Each electrode 13 is made of a metallic material of aluminum and exhibits an elongated hollow cylindrical configuration. Each electrode 13 is firmly held by a socket base plate 17 in a cantilever fashion with the aid of an insulator 15 received in the socket base plate 17. The socket base plate 17 is secured to one side plate of the vacuum housing 3. To assure that each electrode 13 is reliably held in the vacuum housing 3, the free end of the electrode 13 is supported by the opposite side plate of the vacuum housing 3 with the aid of an insulator 21. Each electrode 13 is electrically connected to a power source (not shown) via a cable 23 extending therebetween so that electricity is discharged from the electrode 13 as a high voltage is applied to it. In the following description, one side of each electrode 13, i.e., the side where it is fixedly secured to the socket base plate 17 is referred to as a base end side, and the other side of the electrode 13, i.e., the free end side of the same is referred to as a foremost end side.

A cooling water supplying pipe 25 is concentrically received in each electrode 13 so as to supply cooling water therethrough. The cooling water supplying pipe 25 axially extends from the base end side of the electrode 13 toward the foremost end side of the same, and the foremost end of the cooling water supplying pipe 25 is supported by the left-hand end part of the electrode 13. A plurality of water inflow ports 27 are formed through the cooling water supplying pipe 25 at the positions located in the vicinity of the foremost end of the supported cooling water supplying pipe 25 so as to allow the cooling water to be introduced into the electrode 13 through the water inflow ports 27. On the other side, the base end side of the cooling water supplying pipe 25 is connected to a city water or service water supplying pipe (not shown).

A cooling water discharging pipe 29 is connected to the base end side of the electrode 13 so that the cooling water introduced into the electrode 13 is discharged to the outside through the cooling water discharging pipe 29.

Since the cooling water supplying pipe 25 and the cooling water discharging pipe 29 are arranged for the electrode 13 in the above-described manner, the cooling water can be introduced into the elongated annular hollow space of the electrode 13 and then discharged to the outside through the cooling water discharging pipe 29. The remaining part of the electrode 13 exclusive of the cooling water supplying pipe 25 and the cooling water discharging pipe 29 is liquid tightly sealed by using adequate sealing members so that the cooling water directly contacts with the inner wall of the electrode.

While electricity is discharged from the electrode 13, the cooling water is introduced into the electrode 13 through a cooling water supplying pipe 25 in the A arrow-marked direction, and thereafter, it enters the interior of the electrode 13 from the foremost end of the cooling water supplying pipe 25 through the water inflow ports 27 in the B arrow-marked direction, whereby the cooling water is caused to flow toward base end side of the electrode 13 through the elongated annular hollow space between the inner wall surface of the electrode 13 and the outer peripheral surface of the cooling water supplying pipe 25 in the C arrow-marked direction. During the flowing of the cooling water from the foremost end side to the base end side of the electrode 13, heat of the electrode 13 is radiated into the cooling water, causing the electrode 13 to be cooled with the cooling water. It should be noted that the positions of the cooling water inflow ports 27 should not be limited to the foregoing positions located in the vicinity of the foremost end of the cooling water supplying pipe 25. Alternatively, the cooling water inflow ports 27 may be formed at other positions rather than the aforementioned ones, provided that it is proven that smooth flowing of the cooling water is guaranteed.

As each electrode 13 is cooled, the heated cooling water is discharged from the cooling water discharging pipe 29 in the D arrow-marked direction. The discharged cooling water can be drained to a sewage receptacle as it is. Alternatively, it may recirculatively be introduced into the electrode 13 through the cooling water supplying pipe 25 after it is cooled.

Since each electrode 13 is constructed in the above-described manner, it is possible to cool the electrode 13 from inside thereof during electricity discharging to prevent the excessive temperature increase of the electrode 13 due to the high voltage continuously applied thereto. Consequently, stable glow-discharging treatment can practically be conducted not only without thermal expansion of the electrode 13 and thermal deformation of the same but also without ununiformity of electricity discharging and irregular electricity discharging. In addition, it is possible to prevent the damage of the apparatus and/or material 1 due to the thermal deformation of the electrode.

A speed of flowing of the cooling water and a flow quantity of the same are adequately determined depending on a diameter, a length, and a geometrical configuration of each electrode 13. For example, in the shown embodiment, an outer diameter of each electrode 13 was set to 30 mm, a wall thickness of the same was set to 3 mm, and an effective electricity discharging length of the same (i.e., a length of the electricity discharging range) was set to 2500 mm, and a flow quantity of the cooling water during electricity discharging is set to 5 liters/minute. After the conditions of the cooling water were set in that way, the cooling water was continuously supplied from a service water supply source, the material 1 having a width of 2000 mm was subjected to vacuum glow-discharging treatment for several hours under conditions of applied voltage of 2000 V and a degree of vacuum of 0.3 Torr. On completion of the vacuum glow-discharging treatment, it was confirmed that the temperature of the cooling water was raised up to a level of 40° C. to 50° C., that is, a large quantity of heat was radiated from each electrode 13, and the temperature of the electrode 13 was not excessively elevated.

In addition, a shielding member 31 is disposed on the base end side of each electrode 13 so as to cover a part of the electrode 13 which does not face the longitudinally extending range of the material 1. The shielding member 31 is made of an electrical conductive material such as aluminum or the like in the form of an elongated cylindrical hollow configuration so as to circumscribe a part of the outer peripheral surface of the electrode 13. The shielding member 31 is earthed to the ground via a conductor (not shown). An annular gap between the outer peripheral surface of the electrode 13 and the inner wall surface of the shield member 31 is dimensioned to have a radial distance smaller than a preliminary running distance of an electron required for the purpose of inducing electricity discharging so that the electricity discharging is prevented from occurring in this gap. The foregoing annular gap is generally called an electricity discharging dark part or space, and it is preferable that the radial distance of the electricity discharging dark part is dimensioned to be 5 mm or less regardless of an outer diameter of each electrode 13. To assure that an adequate electricity discharging part is formed by using the shielding member 31, a spacer 33 made of an electrical insulative material is disposed between the electrode 13 and the shielding member 31 at a suitable position(s).

Since electricity discharging does not occur in the part of the electrode 13 covered with the shielding member 31, the electrode 13 is prevented from producing unnecessary electricity discharging. In a case where the electrode 13 is used for the surface treatment of the various materials 1 having respective widths, it is preferable that the effective length of the electrode 13 is coincident with the width of the material 1 to be subjected to the treatment. The shielding member 31 of the invention can be used to adjust the effective length of the electrode 13 easily. That is to say, by attaching to the base end side of electrode a shielding member 31 having a suitable length, the effective length of the electrode 13 can adjustably be defined while the unnecessary electricity is prevented from being discharged from the portion of the electrode 13 which the shielding member 31 surrounds. Thus, since unnecessary electricity discharging does not occur with the electrode 13 as mentioned above, the electrode 13 requires only a quantity of electric power for inducing a desired amount of electricity discharging. Consequently, the electric power to be fed to the electrode 13 can be reduced, which also contributes to preventing the excessive temperature increase of the electrode 13.

As is apparent from FIG. 2, the left-hand end of the shielding member 31 is substantially coincident with the right-hand end edge of the material 1 to be treated. When the present width of the material 1 is changed to another one, it is preferable that the position assumed by the left-hand end of the shielding member 31 is correspondingly changed. For example, it is recommendable that the shielding member 31 is designed in the form of a multi-sleeve structure adapted to be telescopically expanded and contracted so as to enable the foremost end position of the shielding member 31, i.e., the left-hand end position of the same to be adjusted corresponding to variation of the width of the material 1 to be treated. Alternatively, a plurality of shielding members 31 may preliminarily be prepared corresponding to plural kinds of materials 1 each having a different width so as to allow an adequate shielding member 31 to be selected from among the plural shielding members 31.

In this embodiment, the shielding member 31 is disposed only on the base end side of the electrode 13. Another shielding member 31 may additionally be disposed on the foremost end side of the electrode 13 in order to limitatively determine the electricity discharging range between the opposite ends of the electrode 13. When the electricity discharging range is limitatively determined at the opposite ends of the electrode 13 in that way so as to allow electricity discharging to occur in the substantially central region of the electrode 13, electricity discharging treatment can be conducted in the substantially central region of the vacuum housing 3. In this case, spattered material particles can be prevented from flying or scattering onto the vacuum housing 3.

With such construction, it is possible to prevent the excessive temperature increase of the electrode 13 because the electrode 13 is properly shielded so as not to induce unnecessary electricity discharging and cooled from inside thereof. However, since physical properties of the electrode 13 are unavoidably deteriorated over time, it is necessary that the electrode 13 is periodically exchanged with a new one. As mentioned above, each electrode 13 includes a cable 23 required for applying a certain magnitude of voltage to the electrode 13, a cooling water supplying pipe 25, a cooling water discharging pipe 29, and a shielding member 31. Thus, in the case of the conventional apparatus wherein a plurality of electrodes 13 are individually fitted to the vacuum casing 3, exchanging operation for each electrode is unavoidably difficult. In view of the foregoing fact, as shown in FIG. 3, the embodiment of the present invention is arranged so that all electrodes 13 are collectively fitted to a socket 35 which in turn is secured into the vacuum casing 3, to thereby ease each electrode exchanging operation.

In the shown case, each electrode 13 is detachably fitted to the socket 35. A hole is formed through one side wall of the vacuum housing 3 so as to allow the socket 35 to be inserted therethrough. Subsequently, the socket 35 is fixedly secured to the side wall of the vacuum housing 3 by tightening a plurality of bolts (not shown), whereby a plurality of electrodes 13 are arranged in the vacuum housing 3 as shown in FIG. 1. To this end, a plurality of holes 39 are formed through a flange 37 of the socket 35 so that the bolts are inserted through the holes 39. It of course is obvious that a fitting portion of the socket 35 is air-tightly secured to the vacuum housing 3.

When there arises a necessity for exchanging the electrodes 13 or performing a cleaning operation, the sockets 35 are disconnected from the vacuum housing 35, and thereafter the electrode(s) 13 to be exchanged or cleaned is(are) disconnected from the socket 35. Although each electrode 13 includes a cable 23, a cooling water supplying pipe 25, a cooing water discharging pipe 29, and a shielding member 31 in the above-described manner, when all the electrodes 13 are disconnected from the vacuum housing 3 together with the sockets 35, an electrode exchanging operation and a cleaning operation can be achieved at any position where the cables 23, the cooling water supplying pipes 25 and the cooling water discharging pipes 29 obstruct the electrode exchanging operation and the cleaning operation.

In the case of the conventional apparatus, each electrode 13 does not include a cooling water supplying pipe 25 and a cooling water discharging pipe 29 but includes only a cable 23. With this construction, even though the electrodes 13 are directly fitted to the vacuum housing 3, an electrode exchanging operation and a cleaning operation can easily be achieved. On the contrary, according to the present invention, when the apparatus is constructed such that each electrode 13 includes a cable 23, a cooling water supplying pipe 25, a cooling water discharging pipe 29, and a shielding member 31, each electrode fitting portion and the peripheral part thereof are complicated in structure. Thus, when a plurality of electrodes 13 are fitted directly to the vacuum housing 3, it is practically difficult that the respective electrodes 13 are exchanged with new ones, and each cleaning operation is achieved only with much difficulty. In view of the foregoing difficulties, according to the present invention, as shown in FIG. 3, all electrodes 13 are secured to a socket which in turn is fitted to the vacuum housing 3, in order to reduce the difficulties due to the arrangement wherein each electrode 13 includes a cable 23, a cooling water supplying pipe 25, a cooling water discharging pipe 29, and a shielding member 31.

The embodiment of the present invention has been described above with respect to the vacuum glow-discharging treatment for activating the opposite surfaces of a plastic film but the present invention is equally applicable to a spattering technique available for a sheet of metallic material.

According to the present invention, the temperature of each electrode is not excessively elevated, and moreover, the electrode is thermally deformed or distorted, because the electrode is cooled from inside by flowing a coolant therethrough. Thus, since fluctuation of electricity discharging and abnormal electricity discharging do not occur due to thermal deformation of the electrode, stable electricity discharging treatment can be conducted irrespective of how long the electricity discharging treatment is conducted. In addition, since the temperature of each electrode is not excessively elevated, the electrode and associated components are not thermally damaged. Additionally, since a plurality of electrodes are integrated with a socket, each electrode can easily be attached to and detached from the apparatus, and moreover, each maintenance service and each inspecting operation can easily be performed for the apparatus.

What is claimed is:

1. An apparatus for allowing the opposite surfaces of a web-shaped material to be subjected to vacuum glow-discharging treatment wherein the web-shaped material to be treated is conveyed in a vacuum housing while it faces a plurality of electrodes arranged on the opposite sides thereof so that the opposite surfaces of the web-shaped material are subjected to electricity discharging treatment by discharging electricity from the respective electrodes, said apparatus comprising:

a hollow space serving as a coolant flow path formed in each of the electrodes; and a coolant supplying pipe for supplying a coolant to the hollow space and a coolant discharging pipe for discharging the coolant from the hollow space connected to each of the electrodes wherein said plurality of electrodes are fitted to a single common socket adapted to be attached to and detached from the vacuum housing of the apparatus.

2. An apparatus for allowing the opposite surfaces of an elongated, web-shaped material to be subjected to vacuum glow-discharging treatment wherein the material to be treated is conveyed in a vacuum housing so that the opposite surfaces of the web-shaped material are subjected to electricity discharging treatment by discharging electricity from electrodes, said apparatus comprising:

a plurality of electrodes arranged in the vacuum housing to face opposite sides of the web-shaped material, each of the electrodes in the form of a rod extending in the transverse direction relative to the direction of elongation of the web-shaped material such that first longitudinal portion of said electrodes directly opposes said web-shaped material and a second longitudinal portion of said electrodes is laterally offset to a side of said web-shaped material; and a shielding member made of metallic material covering only said second longitudinal portion of each of the electrodes, wherein the shielding member is connected to ground via a conductor and is spaced away from the outer peripheral surface of each of the electrodes by a gap which is sufficiently small to prevent discharging of electricity from occurring in the gap when the web-shaped material is subjected to glow discharging treatment.

3. The apparatus according to claim 2, wherein said plurality of electrodes are fitted to a single common socket adapted to be attached to and detached from the vacuum housing of the apparatus.

4. An apparatus as claimed in claim 2 wherein a distance of said gap is not greater than 5 mm.

5. A method of allowing the opposite surfaces of a web-shaped material to be subjected to vacuum glow-discharging treatment wherein the web-shaped material to be treated is conveyed in a vacuum housing while it faces a plurality of electrodes arranged on the opposite sides thereof so that the opposite surfaces of the web-shaped material are subjected to electricity discharging treatment by discharging electricity from the respective electrodes, said method comprising the steps of:

subjecting opposite surfaces of the web-shaped material to electricity discharging treatment by discharging electricity from the plurality of electrodes; and cooling each of the electrodes from inside by flowing a coolant through each of the electrodes, wherein said electrodes are fitted into a single common socket adapted to be attached to and detached from the vacuum housing.

6. A method of allowing the opposite surfaces of a web-shaped material to be subjected to vacuum glow-discharging treatment, said method comprising:

providing a plurality of electrodes on opposite sides of the web-shaped material in such a manner that a first longitudinal portion of said electrodes directly opposes said web-shaped material and a second longitudinal portion of said electrodes is laterally offset to a side of said web-shaped material;

providing a shielding member only around each of said second longitudinal portions of said electrodes;

conveying the web-shaped material to be treated in a vacuum chamber while it faces the plurality of electrodes arranged on the opposite sides thereof; and subjecting the opposite sides of the web-shaped material to electricity discharging treatment by discharging electricity from the respective electrodes, wherein the shielding member is connected to ground via a conductor and is spaced away from the outer peripheral surface of each of the electrodes by a gap which is sufficiently small to prevent discharging of electricity from occurring in the gap when the web-shaped material is subjected to glow discharging treatment, wherein the opposite surfaces of the web-shaped material are subjected to electricity discharging treatment by discharging electricity from the respective electrodes.

7. An apparatus for glow discharge treating a material, comprising:

a housing;

a plurality of electrodes disposed in said housing proximate a conveyance path of the material so that the material can be treated by discharging electrical charge from the electrodes; and a socket which is adapted to be removably attached to said housing, said plurality of electrodes being fitted in said socket.

8. An apparatus for glow discharge treating a material, comprising:

a housing;

a plurality of electrodes disposed in said housing proximate a conveyance path of the material such that a first longitudinal portion of said electrodes directly opposes said web-shaped material and a second longitudinal portion of said electrodes is laterally offset to a side of said web-shaped material, the material treatable by discharging electrical charge from the electrodes; and a shielding member disposed only around said second longitudinal portion of each of said electrodes, a gap being defined between said shielding members and corresponding ones of said electrodes, said gap being sufficiently small to prevent discharging of electricity from occurring in the gap when the web-shaped material is subjected to glow discharging treatment, wherein said shielding members are electrically conductive and grounded.

9. An apparatus as claimed in claim 8 wherein a distance of said gap is not greater than 5 mm.

* * * * *